United States Patent Office 3,334,750
Patented Aug. 8, 1967

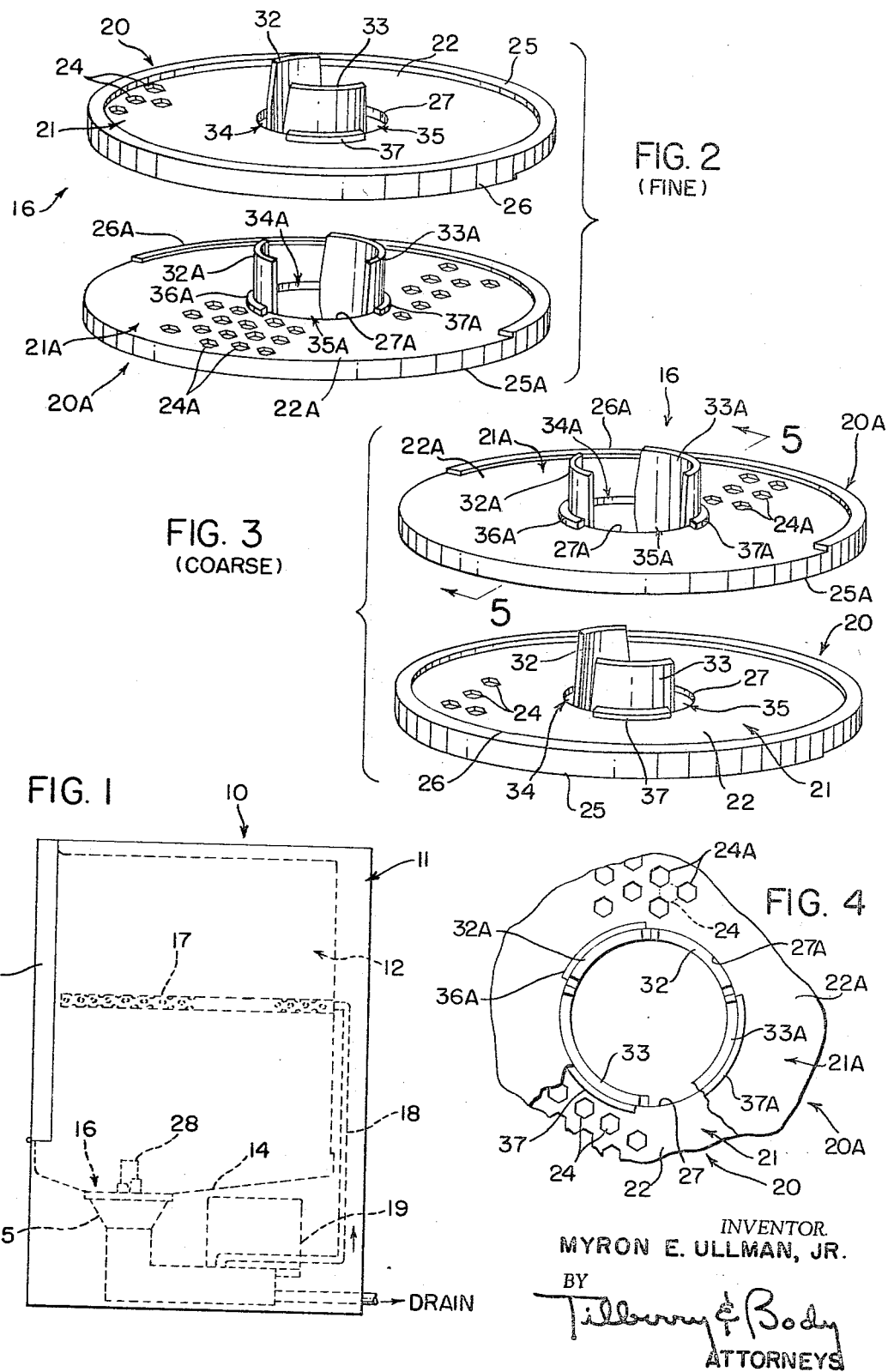

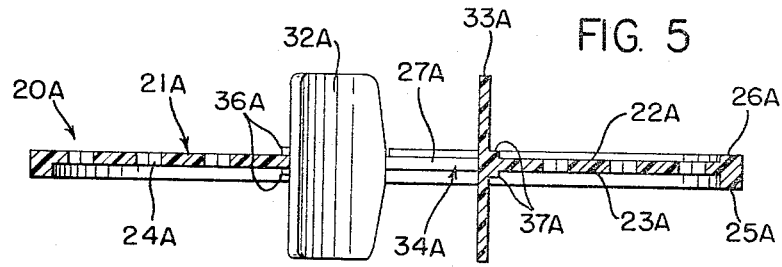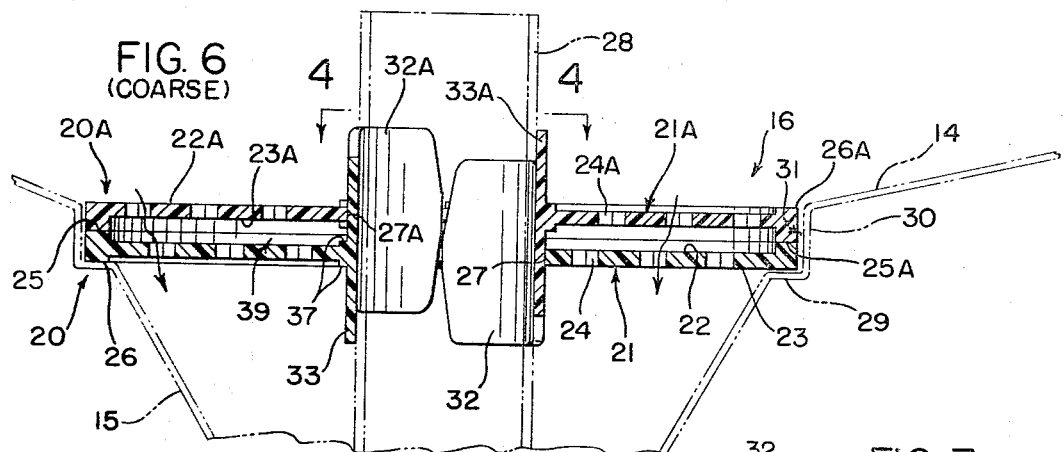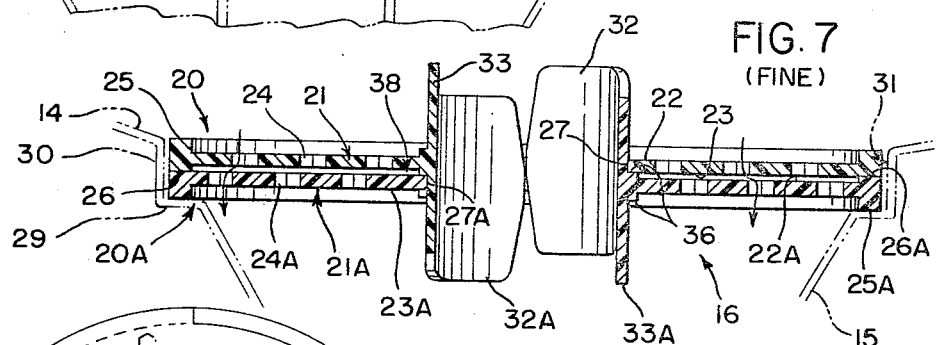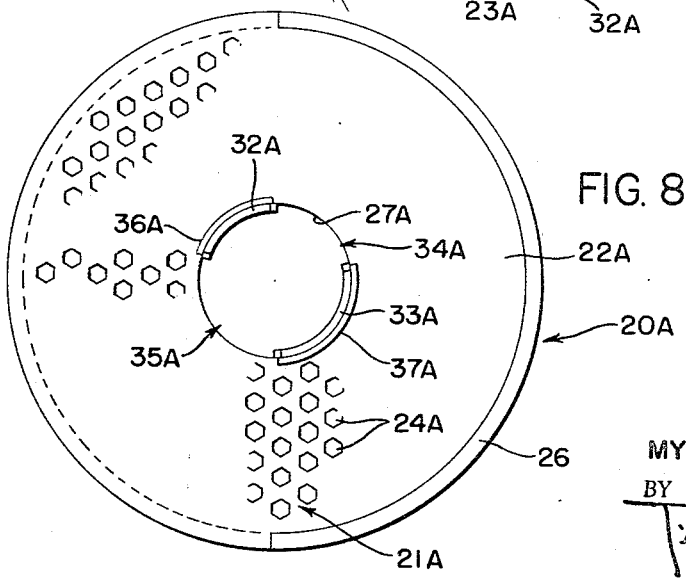

3,334,750
DISHWASHER STRAINER WITH ALTERNATE
FILTERING POSITIONS
Myron E. Ullman, Jr., Canfield, Ohio, assignor to Mullins
Manufacturing Corporation, Warren, Ohio, a corporation of Ohio
Filed May 31, 1963, Ser. No. 284,397
4 Claims. (Cl. 210—239)

This invention relates to an improved filter means for an automatic dishwasher of the domestic variety, and in particular this invention relates to an improved filter means which may be easily and quickly adjusted for either coarse or fine filtering at the option of the user.

Users of domestic dishwashers have varying preferences as to the amount of pre-cleaning which is desirable prior to placing dishware in a dishwasher for final cleaning. Thus, if a large amount of residue is left on the dishware upon being placed in the dishwasher a greater amount of filtering will be necessary than if the dishware is more completely cleaned before being placed in the dishwasher. Inasmuch as this is largely a matter of choice upon the part of the user, it is felt that it is desirable, therefore, to have a strainer which may be quickly adjusted to the particular requirements of the dishwasher. It is also recognized that these requirements may vary from day to day or from meal to meal, and it is therefore desirable to be able to easily adjust the strainer depending on the circumstances of the particular meal.

Therefore, according to the teachings of this invention, an improved filter means is provided for a dishwasher or the like wherein the filter means is selectively adjustable to provide either coarse filtering or fine filtering.

In particular, one embodiment of the filter means of this invention comprises a pair of like foraminous discs or members, i.e., members having a plurality of straining openings passing therethrough. The discs are so constructed and arranged in a manner hereinafter described, that when the same are disposed together in a desired position relative to each other, the discs are adapted to strain out excessively large particles of food or the like.

The discs or members of this invention can also be disposed in an alternate position to provide fine filtering of small food particles that would normally tend to pass through the filter means in the coarse position.

Accordingly, it is an object of this invention to provide an improved filter means for a dishwasher or the like, the filter means having one or more of the novel features of this invention as set forth above or hereinafter shown or described.

Another object of this invention is to provide an improved part for such a filter means or the like.

Other objects, uses and advantages of this invention are apparent from a reading of this description which proceeds with reference to the accompanying drawings forming a part thereof and wherein:

FIGURE 1 is a schematic view illustrating a typical dishwasher or the like utilizing the filter means of this invention.

FIGURE 2 is an exploded perspective view illustrating the members of the filter means of this invention disposed in a position to provide fine filtering.

FIGURE 3 is a view similar to FIGURE 2 and illustrates the discs or members of this invention disposed in a position to provide coarse filtering.

FIGURE 4 is a broken away top view of the structure illustrated in FIGURE 6.

FIGURE 5 is a cross sectional view taken on line 5—5 of FIGURE 3 and illustrates one of the like members or discs of this invention.

FIGURE 6 is a cross sectional view illustrating the discs or members of this invention disposed in their coarse filtering position in the dishwasher of FIGURE 1.

FIGURE 7 is a view similar to FIGURE 6 and illustrates the filter means of this invention disposed in its fine filtering position.

FIGURE 8 is a top view of the discs illustrated in FIGURE 5.

While the various features of this invention are hereinafter illustrated and described as being particularly adaptable to provide filter means for a dishwasher or the like, it is to be understood that the various features of this invention can be utilized singly or in any combination thereof to provide filter means for other devices as desired.

Therefore, this invention is not to be limited to only the embodiment illustrated in the drawings because the drawings are merely utilized to illustrate one of the wide variety of uses for this invention.

Further, while one means is hereinafter provided for selectively adjusting the filter means of this invention between its fine filtering position and its coarse filtering position, it is to be understood that other adjusting means can be provided for such a filter means or the like and will fall within the scope of the appended claims.

Referring now to FIGURE 1, a conventional dishwasher or the like is generally indicated by the reference numeral 10 and comprises a cabinet 11 having a compartment 12 formed therein for receiving the dishes in suitable racks or the like disposed in the compartment 12, the compartment 12 being selectively opened and closed by a door means 13 of the dishwasher 10 in a conventional manner.

The bottom wall 14 of the compartment 12 of the dishwasher 10 is so constructed and arranged that the same is adapted to direct water in the compartment 12 to a drain conduit structure 15, the drain 15 having a filter means 16 of this invention disposed therein to strain the water passing into the drain 15 so that the same can be utilized over again during the washing and the rinsing cycle of the dishwasher 10 in a conventional manner.

For example, the dishwasher 10 has a spraying conduit 17 disposed in the compartment 12 for spraying wash or rinse water on the dishes disposed in the compartment 12, the spray nozzle 17 receiving water from a conduit 18 leading from a pump 19 which is adapted to take at least part of the water from the drain 15 and direct the same to the nozzle 17 in a conventional manner.

Therefore, it can be seen that it is necessary to provide the filter means 16 of this invention in the drain 15 of the dishwasher 10 illustrated in FIGURE 1 so that the water which is to be recirculated in the compartment 12 of the dishwasher 10 will be suitably strained of large objects which would tend to clog or adversely affect the pump 19 and spray nozzle 17.

Further, the filter means 16 of this invention must be adapted to prevent large quantities of small food particles or the like which are adapted to pass through the pump means 19 and nozzle means 17 from reaching the nozzle means 17 so that the same will not be sprayed back on the dishes to again soil the same.

The details of the filtering means 16 of this invention will now be described.

As illustrated in FIGURES 2 and 3, the filter means 16 of this invention comprises a pair of identical foraminous or regularly perforated disc members 20 and 20A respectively. For purposes of description, reference will be made to foraminous disc member 20, and identical parts on foraminous disc member 20A will be identified by like numerals plus the suffix "A."

Disc member 20 includes flat circular body portion 21 defined by opposed flat surfaces 22 and 23, as best illustrated in FIGURE 7. Since disc member 20 is identical to the other disc 20A it can be seen that the apparatus for forming one of the discs 20 can be also utilized to form the other disc 20A. Thus, the filter means 16 can be produced in an economical manner.

While disc 20 can be formed of any suitable material and in any suitable manner, the embodiment thereof illustrated in the drawings is formed from a suitable plastic material and shaped in the configuration illustrated in the drawings by a suitable molding process or the like.

In order to render the disc 20 foraminous, a plurality of openings 24 are provided passing through the circular body portion 21 thereof. The openings 24 are preferably hexagonally shaped to not only permit a greater number of openings, but also to provide a more offset relation between the openings in adjacent discs 20 and 20A in a manner hereinafter set forth.

Disc 20 has an outwardly directed annular peripheral flange means 25 extending from the body portion 21 thereof to provide coarse filtering in a manner hereinafter set forth, and an oppositely directed substantially semi-circular flange means 26 to provide fine filtering. This flange means 26 is shorter in height than the flange means 25 thereof for a purpose hereinafter described.

Disc 20 also has a circular and centrally disposed aperture 27 passing therethrough to receive a conduit 28, as shown in FIGURES 6 and 7. Conduit 28 projects centrally out of the drain 15 whereby the discs 20 and 20A can be held in the proper position in the drain 15. In addition, the drain 15 is so constructed and arranged that the same defines an annular shoulder 29 and an upstanding cylindrical wall 30 which cooperates together to define an annular recess 31. Recess 31 is adapted to receive the discs 20 and 20A in the manner illustrated in FIGURES 6 and 7, whereby the filter means 16 is adapted to be positively located in the drain 15 to provide the straining and filtering operation.

A pair of dissimilar arcuate flange members 32 and 33 are integrally and transversely interconnected to the flat body portion 21 of disc 20 to extend outwardly from both sides of aperture 27. These flanges are spaced apart to define a pair of dissimilar arcuate slots 34 and 35 therebetween which are adapted to respectively receive the flange members 32A and 33A of the other disc 20A in the manner illustrated in FIGURES 6 and 7. In this manner the discs 20 and 20A are positively located relative to each other when the discs are arranged to provide coarse filtering in the manner illustrated in FIGURE 6, or fine filtering in the manner illustrated in FIGURE 7. The flange members 32–33, and 32A–33A also prevent rotational movement between the interconnected discs.

Flange members 32–32A and 33–33A have their opposed side edges thereof converging as they extend away from the flat mounting body 21 thereof to facilitate insertion of the flange members in the respective slots 34–34A and 35–35A as illustrated in FIGURES 6 and 7. Reinforcing arcuate portions 36–36A and 37–37A are formed integrally with each body portion of each disc and with the respective flange means 32–32A and 33–33A at the opposed sides of the body portions 21–21A in the manner such as illustrated in FIGURE 5 to reinforce the flange means shown there.

When it is desired to use the filtering means 16 of the dishwasher 10 to provide fine filtering, the two discs 20 and 20A are arranged in the positions illustrated in FIGURES 2 and 7. The side 23 of the upper disc 20 faces the opposite side 22A of the lower disc 20A with the peripheral flange means 26–26A thereof being disposed out of phase with each other. In this manner, when the flange members 32–32A and 33–33A are respectively received in the slot means 34–34A and 35–35A, the flange means 26–26A engage the surfaces 22A–23 respectively of the opposed discs. The interconnected discs 20–20A then have the surfaces 22A–23 thereof spaced from each other only by the height of the flange means 26–26A, in the manner illustrated in FIGURE 7, to provide a relatively narrow particle trapping chamber 38 between the discs. As can be seen from FIGURE 7, the openings 24 in the upper disc 20 are substantially fully offset relative to the openings 24A in the lower disc 20A so that the water flowing from the interior of the compartment 12 into the drain 15 of the dishwasher 10 must move in a tortuous path, as shown by the arrows of FIGURE 7. Particles too large to pass through the openings 24 of the upper disc 20 will be retained on top of the surface 23 for easy removal. Cleaning chamber 38 is accomplished by merely lifting the top disc 20 vertically upwardly from the lower disc 20A for immediate access to the particles which have been trapped between the discs.

The coarse filtering position is illustrated in FIGURE 6. In order to convert the filter means 16 from the fine filtering condition illustrated in FIGURE 7 to the coarse filtering condition illustrated in FIGURE 6, the user merely takes the discs 20–20A which have been disposed in the position illustrated in FIGURE 2 to provide fine filtering, grasps the lower disc 20A and moves the same above the upper disc 20, being careful not to rotate the lower disc 20A about any diameter. The discs 20–20A will then have the sides 22–23A facing each other in the manner illustrated in FIGURES 3 and 6. Thereafter, the discs 20–20A are moved toward each other whereby the flange members 32–32A and 34–34A are respectively received in the slots 34–34A and 35–35A of the discs to interconnect the discs in the manner illustrated in FIGURE 6. The facing sides 22–23A, being spaced from each other by a distance corresponding to the height of the flange means 25–25A, provide a relatively wide compartment 39 between the discs.

Thus, it can be seen from the arrows of FIGURE 6 that even when the discs 20 and 20A of the filtering means 16 are disposed in a position for coarse filtering, the openings 24A in the upper disc 20A are fully offset relative to the openings 24 in the lower disc 20, so that the water passing through the filter means 16 must still travel in a tortuous path. It will be further appreciated that this invention provides an improved filter means for a dishwasher or the like wherein the filter means is easily selectively adjustable from a fine filtering position to a coarse filtering position, and in either position is quickly cleanable by quick separation of the component parts 20 and 20A.

While the form of the invention now preferred has been disclosed as required by statute, other forms may be used, all coming within the scope of the claimed subject matter which follows.

What is claimed is:

1. A strainer for an automatic dishwasher or the like comprising a pair of identical disc like perforated members adapted to be superposed one concentrically adjacent to the other in only two alternate preselected relationships, the first relationship being adapted for coarse straining and the second relationship being for fine straining and the perforations thereof being axially offset in either relationship, each disc member including a wafer-like body having:
   (a) a full circular annulus projecting upwardly from the periphery of one side of said wafer;
   (b) a semi-circular annulus projecting downwardly from the periphery of the opposite side of said wafer;
   (c) an aperture in the center of said wafer;
   (d) a pair of dissimilar arcuate flange members transversely secured to said wafer within said aperture to project outwardly from opposite sides thereof, said flange members being arcuately spaced apart to receive the corresponding flange members of the other disc member therebetween, the configuration of said flange members being adapted to permit only two prearranged alignments of the respective flange members;

(e) the first alignment of said flange members bringing said full circular annuli into concentric abutting contact with the respective openings in said disc-like foraminous members being fully offset;

(f) the second alignment of said flange members bringing said semi-circular annuli into a co-planar relationship 180° out of phase one with the other whereby each semicircular annulus abuts the face of the other disc member to permit closer axial spacing between said disc members than when said full circular annuli are in abutting relationship;

(g) the upper and lower faces of each disc member maintaining these relationships in both coarse and fine straining positions; and (h) whereby alternate straining is obtained by removing the flanges of the lower disc member from engagement through the under side of the aperture of the upper disc member and reassembling said disc members to reverse their previous relationship.

2. The strainer set forth in claim 1, wherein the foraminous nature of said discs includes a plurality of hexagonal openings geometrically spaced to provide a condition of maximum openings per unit area and full offset between openings of upper and lower discs.

3. A fluid filter comprising a pair of perforated members in the form of discs each having opposed flat surfaces, projection means on said opposed flat surfaces which space the members against each other in two alternate filtering positions, the first being a coarse filtering position common to at least one surface of each member and the second being a fine filter position common to a different surface of at least one member, the space between members in the first position with respect to the one surface of each member being greater than that in the second position with respect to the different surface of the one member and the perforations in the respective perforated members being axially offset with respect to one another and each at least as wide as the space between the respective surfaces in the fine filtering position, said projection means which space the members in the coarse filtering position comprising a 360° peripheral flange projecting from said one surface of each member and the projection means which space the members in the fine filtering position comprising a 180° peripheral flange projecting from the other surface of each member, said 360° peripheral flanges mating and said 180° peripheral flanges complementing each other to substantially close the circumferential side between said members.

4. A fluid filter as set forth in claim 3 wherein each said perforated member has a central aperture passing therethrough and having a pair of dissimilar flange members projecting transversely therefrom to defined slots therebetween adapted to respectively receive such flange members of the other perforated member only in a predetermined arrangement and to lock said members from rotational movement relative to each other.

References Cited

UNITED STATES PATENTS

| | | | |
|---|---|---|---|
| 744,060 | 11/1903 | Frye | 210—239 |
| 831,767 | 9/1906 | Boden | 210—239 X |
| 1,857,348 | 5/1932 | Bokenkroger | 55—446 |
| 2,629,390 | 2/1953 | Walker | 210—167 X |
| 3,228,525 | 1/1966 | Evans et al. | 210—336 X |

REUBEN FRIEDMAN, *Primary Examiner.*

F. W. MEDLEY, *Assistant Examiner.*

UNITED STATES PATENT OFFICE
CERTIFICATE OF CORRECTION

Patent No. 3,334,750                                August 8, 1967

Myron E. Ullman, Jr.

It is hereby certified that error appears in the above numbered patent requiring correction and that the said Letters Patent should read as corrected below.

In the heading to the printed specification, lines 5 and 6, for "Warren, Ohio, a corporation of Ohio" read -- Salem, Ohio, a corporation of Delaware --.

Signed and sealed this 22nd day of October 1968.

(SEAL)
Attest:

Edward M. Fletcher, Jr.                          EDWARD J. BRENNER
Attesting Officer                                 Commissioner of Patents